Dec. 23, 1941.   E. S. HEIMARK   2,267,237
TRACTOR OPERATED BULLRAKE
Filed Dec. 28, 1940   3 Sheets-Sheet 3
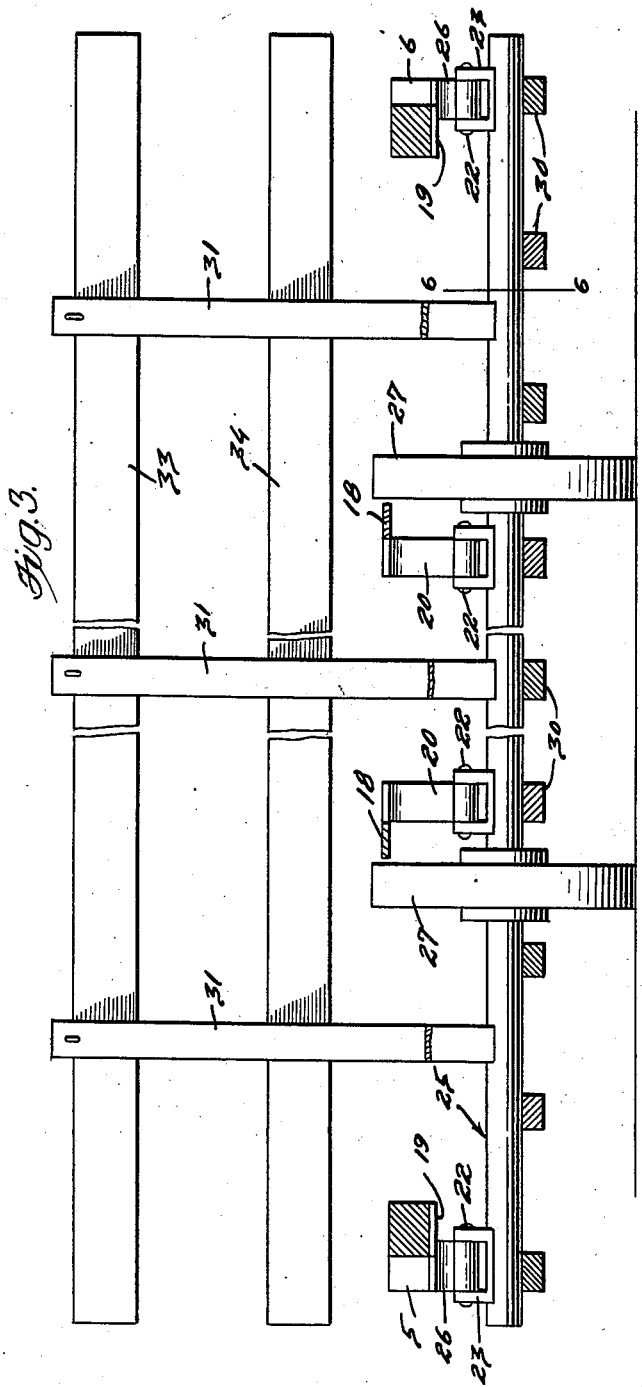
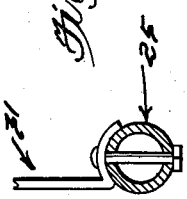
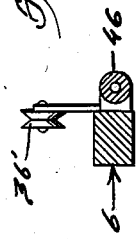
Inventor
Edward S. Heimark
By Clarence A. O'Brien
Attorney Patented Dec. 23, 1941

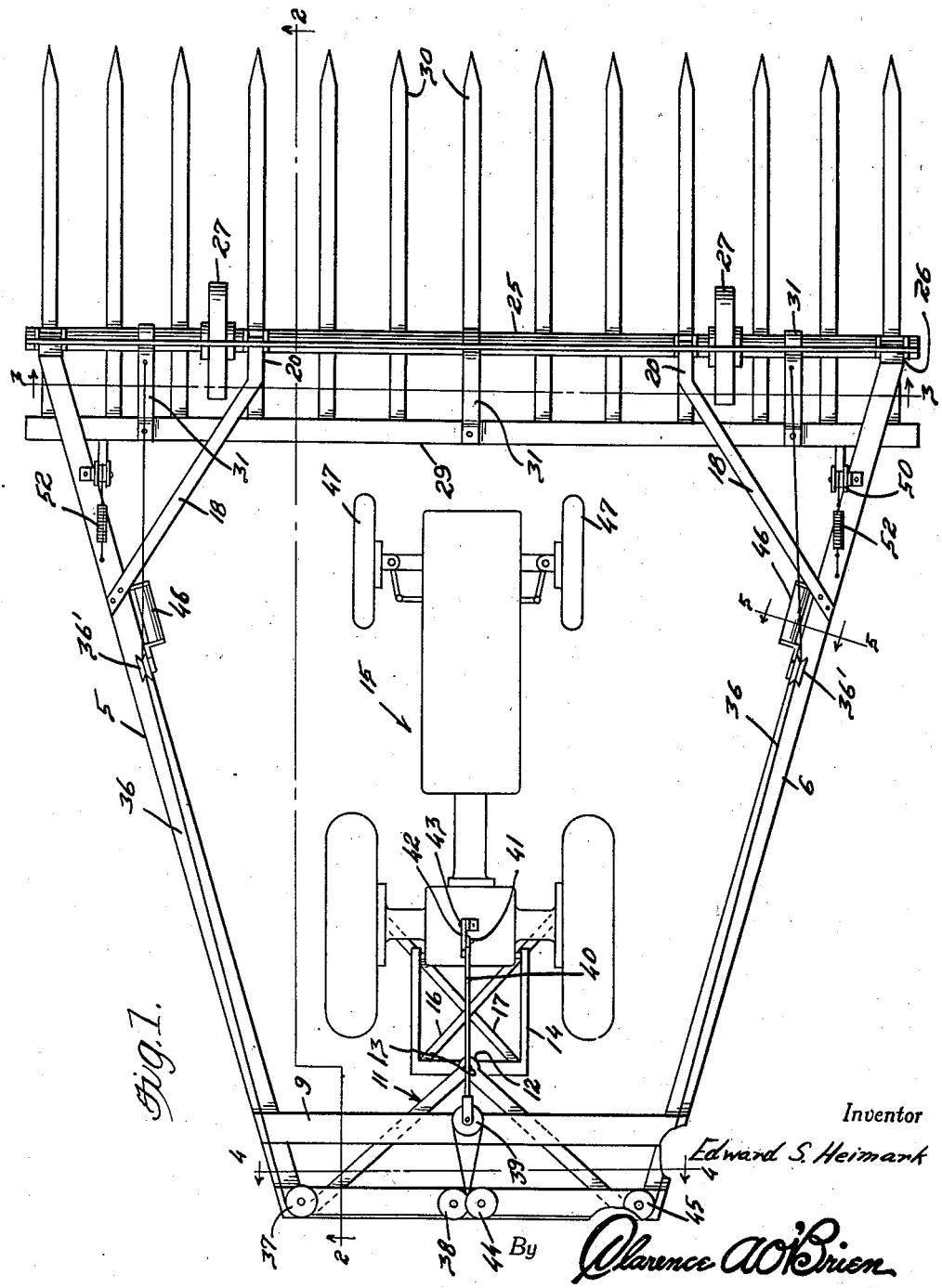

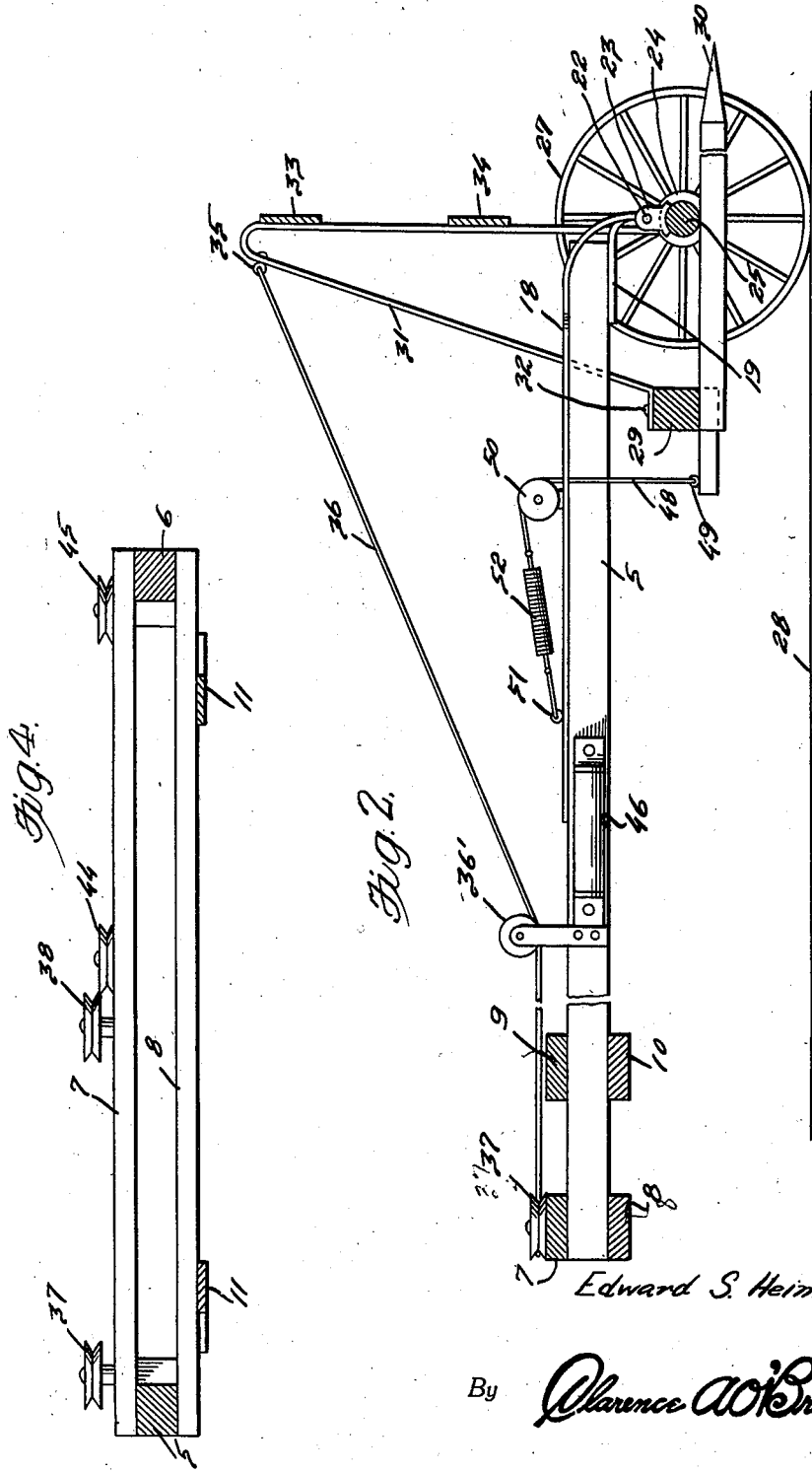

2,267,237

UNITED STATES PATENT OFFICE 2,267,237

TRACTOR OPERATED BULLRAKE

Edward S. Heimark, Philipsburg, Mont.

Application December 28, 1940, Serial No. 372,122

3 Claims. (Cl. 56—27)

My invention relates to improvements in tractor operated bullrakes, and the primary object of the invention is to provide an arrangement of this character of improved form and construction which permits of turning the bullrake toward either side without sliding the wheels or lifting the bullrake bodily from the ground.

Other important objects and advantages of my invention will be apparent from a reading of the following description taken in connection with the appended drawings, wherein for purposes of illustration I have shown a preferred embodiment of my invention.

In the drawings:

Figure 1 is a general top plan view of the embodiment.

Figure 2 is a longitudinal vertical sectional view taken through Figure 1 along the line 2—2 and looking in the direction of the arrows.

Figure 3 is a contracted front elevational view and transverse section taken along the line 3—3 of Figure 1 and looking in the direction of the arrows.

Figure 4 is a transverse vertical sectional view taken through Figure 1 along the line 4—4 and looking in the direction of the arrows.

Figure 5 is a transverse cross section taken along the line 5—5 of Figure 1 and looking in the direction of the arrows.

Figure 6 is a transverse vertical sectional view taken along the line 6—6 of Figure 3.

Referring in detail to the drawings, the present bullrake comprises similar forwardly diverging side bars 5 and 6 which are spaced and connected at their rear ends by upper and lower transverse end members 7 and 8 which engage the top and bottom of the side bars as shown in Figure 4. Another pair of transverse upper and lower members 9 and 10 similarly space and connect the side bars 5 and 6 at a point slightly forwardly of the first-mentioned transverse member. The upper and lower transverse members 9 and 10 operate as retainers for the V-shape draft bar 11 whose rearwardly diverging legs are connected at their extremities to the lower transverse end member 8 as indicated in Figure 4. At the junction of the forward ends of the legs of the draft bar is a kingpin journal 12 receiving the kingpin 13 which projects upwardly from a rectangular frame 14 mounted on the rear axle housing or other rear part of the tractor 15 which is located between the side bars 5 and 6 and forwardly of the transverse members 9 and 10, the rectangular frame 14 extending rearwardly from the tractor and being characterized by the presence of crossed diagonal braces 16 and 17, contributing rigidity and required strength.

The front ends of the side bars 5 and 6 have extending forwardly and downwardly therefrom companion upper and lower bars 18 and 19, respectively, the upper bars 18 being laterally inwardly angulated as shown in Figure 1 to terminate at their forward ends in parallel downturned portions 20 which are connected by hinge pins 22 between pairs of ears 23 projecting upwardly from axle bearings 24 through which the axle 25 rotatably extends across the entire front of the bullrake. The forward ends of the lower members 19 similarly terminate in parallel portions 26 which are similarly hinged to the corresponding axle journals 24 as above described, all of the hinge pins of the joints thus formed being axially aligned, so that the axle bearings or journals may be tilted forwardly or rearwardly with respect to the side bars for a purpose to be explained. On the axle 25 are two or a suitable number of ground-engaging wheels 27, supporting the frame of the bullrake at the desired elevation with respect to the ground 28. The rear part of the bullrake frame is supported at the required elevation above the ground 28 by reason of the attachment of the draft means 11 to the tractor carried frame 14 upon which the draft means rests as already explained.

The rake consists of the cross bar 29 which extends the full width of the bullrake frame at a point to the rear of and parallel to the axle 25 and has attached to the bottom side thereof as illustrated in Figure 2 the forwardly projecting substantially parallel rake teeth 30 which extend under the axle 25 to a point substantially forwardly of the wheels 27 as illustrated in Figure 1. At suitably spaced transverse intervals there rise from the member 29 inverted V-shaped bars 31 which have the rear leg attached to the top of the bar 29 as indicated by the numeral 32 and have the lower end of the front leg bolted, as shown in Figure 6 of the drawings, to the axle 25 between and at the outer sides of the wheels 27. Horizontal, vertically spaced bars 33 and 34, respectively, are fixed to the front sides of the front legs of the inverted V-shaped bars 31 above the level of the ground engaging wheels 27 to act as a back stop for the material raked and accumulated by the rake teeth 30 in the forward progress of the bullrake. The laterally outward ones of the inverted V-bars 31 have the upper parts thereof connected as indicated by the numeral 35 to the front end of a cable 36 which runs under pulley 36' projecting from the corresponding side bars, as illustrated in Figure 2 in connection with the side bar 5, the cable running rearwardly beyond the pulley 36 and around the sheave 37 on top of the corresponding end of the upper transverse bar 7 and around the sheave 38 located near the middle of this transverse member as illustrated in Figure 4, thence around a sheave 39 on the rear end of the compensating link 40 which is pivoted at its front end as indicated by the numeral 41 to a lever 42 pivoted at its lower end at 43 on the rear part of the tractor 15. The cable 36 continues around the sheave 39 and turns rearwardly and then toward the right side of the bullrake frame around the sheave 44 which is located next to the sheave 38 and thence passes around the sheave 45 at the right hand extremity of the upper transverse member 7 and then forwardly and under another pulley 36' fastened to the side bar 6, whence the cable passes through a connection 35 with the extreme right hand inverted V-bar. By reason of the cable and pulley arrangement described the angulation of the tractor 15 out of the normal longitudinally aligned position shown in Figure 1 will produce a pull on the cable 36 which will operate to tilt the upper part of the inverted V-shaped bars 31 rearwardly and thereby tilt upwardly the pointed forward extremities of the teeth 30 of the rake, so that they will not dig into the ground in an operation of turning the bullrake. It will be obvious that to effect a left turn of the bullrake the tractor must be angulated to the right, whereas angulation of the tractor toward the left is required to achieve a right hand turn of the bullrake. The inner sides of the side bars 5 and 6 carry rollers 46 in a position to be engaged by the front wheels 47 of the tractor in an extreme angulated position of the tractor, so as to prevent injury to the bullrake and to the tractor and to prevent extreme and unwanted and injurious positions of the bullrake and the tractor.

Normally keeping the rake teeth 30 in a substantially horizontal operative position are the cables 48 which are attached to the rear ends of the teeth as indicated by the numeral 49 and pass upwardly over pulley 50 on the corresponding side bars and connected at their ends as indicated by the numeral 51 to rearwardly spaced points of these side bars, with an adjustable tension spring arrangement 52 connected in the cable between the pulley 50 and the anchor 51, whereby the desired constant tension may be produced, while allowing for compensatory rearward tilting and hence depression of the rear ends of the rake teeth during turns and other actions of the device.

Although I have shown and described herein a preferred embodiment of my invention, it is to be definitely understood that I do not wish to limit the application of the invention thereto except as may be required by the scope of the subjoined claims.

Having described the invention, what is claimed as new is:

1. A tractor drawn bullrake comprising a frame comprising a pair of laterally spaced side bars, a transverse axle beneath the front end of said side bars having ground engaging wheels, means on the front end portions of said side bars projecting downwardly into proximity with said axle, pivot means supportably connecting said means to said axle whereby the side bars may be swung on a horizontal axis relative to said axle, a cross bar connecting the rear ends of said side bars, a forwardly projecting draft member between said side bars and connected at its rear to said cross bar, and a rake assembly mounted on said axle and having rake teeth projecting forwardly from said ground engaging wheels, and a tractor positioned between said side bars, a draft element on the rear of said tractor and including a vertical kingpin, said draft member having a forwardly positioned kingpin journal accepting said king pin whereby said tractor is laterally dirigible relative to said frame on the axis of said kingpin.

2. A tractor-drawn bull-rake comprising a frame embodying a pair of laterally spaced side bars, a transverse axle beneath the front ends of said side bars having ground-engaging wheels, means on the front end portions of said side bars projecting downwardly into proximity with said axle, pivot means supportably connecting said means to said axle whereby the side bars may be swung on a horizontal axis relative to said axle, a cross-bar connecting the rear ends of said side bars, a forwardly projecting draft member between said side bars and connected at its rear to said cross-bar, and a rake assembly mounted on said axle and embodying rake teeth projecting forwardly from said ground-engaging wheels, a transverse member located behind said axle and below said side bars, forwardly and rearwardly flexible means supporting said transverse member from said axle, pulley and cable means on said frame including a cable attached at its forward end to said flexible means, and compensating means for drawing rearwardly on said cable to tilt the front ends of the teeth upwardly, yieldable positioning means for normally holding said rake assembly with the teeth substantially parallel with the ground, and said positioning means comprising spring-tensioning means operatively connected between said rake assembly at a point to the rear of said axle and anchored on said frame above said rake assembly.

3. A tractor-drawn bull-rake comprising a frame embodying a pair of laterally spaced side bars, a transverse axle beneath the front ends of said side bars and having ground-engaging wheels, means on the front end portions of said side bars projecting downwardly into proximity with said axle, pivot means supportably connecting said means to said axle whereby the side bars may be swung on a horizontal axis relative to said axle, a cross-bar connecting the rear ends of said side bars, a forwardly projecting draft member between said side bars and connected at its rear to said cross-bar, and a rake assembly mounted on said axle and embodying rake teeth projecting forwardly from said ground-engaging wheels, a transverse member located behind said axle and below said side bars, forwardly and rearwardly flexible means supporting said transverse member from said axle, pulley and cable means on said frame including a cable attached at its forward end to said flexible means, and compensating means for drawing rearwardly on said cable to tilt the front ends of the teeth upwardly, a tractor positioned between said side bars, means on the rear of said tractor pivotally connecting said draft member thereto on a vertical axis, said compensating means comprising an element on said tractor, said element being arranged to exert a pull on said cable as the tractor is swung toward either side relative to said frame as a consequent turn of the bull-rake is effected.

EDWARD S. HEIMARK.